Dec. 22, 1931.  J. O. REDINBAUGH  1,837,585
SUPPORTING BRACKET
Filed May 2, 1928
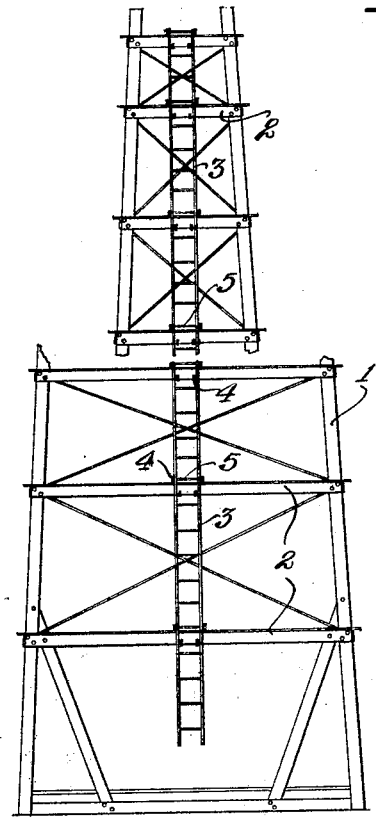
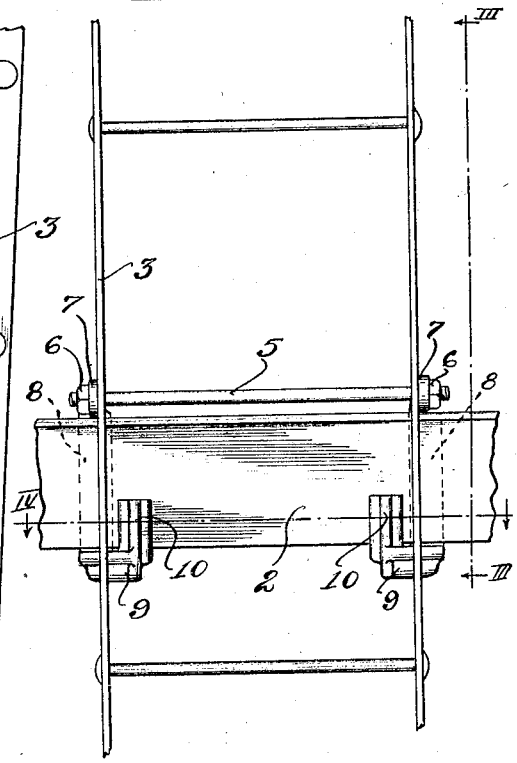
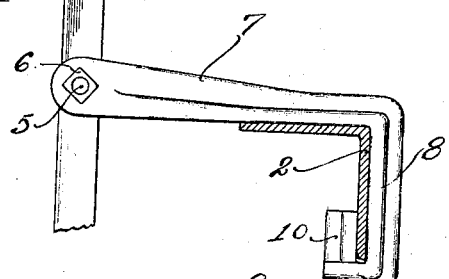
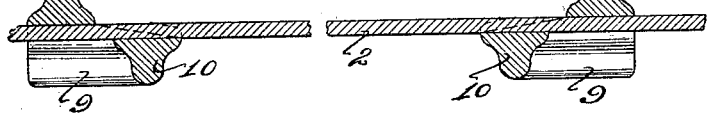
Inventor
James O. Redinbaugh Patented Dec. 22, 1931

1,837,585

UNITED STATES PATENT OFFICE

JAMES O. REDINBAUGH, OF TULSA, OKLAHOMA, ASSIGNOR TO DALLAS D. WERTZBERGER, OF TULSA, OKLAHOMA

SUPPORTING BRACKET

Application filed May 2, 1928. Serial No. 274,430.

This invention relates to improvements in supporting brackets, and more particularly to supporting brackets of the type used for mounting devices of substantially any desired character on girts, struts, braces, supports, or means of similar character and nature, and is highly desirable for the ready and easy mounting of ladders and the like on trestles, derricks, and various fabricated structures, although many and varied uses of the device will be apparent to those skilled in the art.

In the past, means for securing and supporting ladders and the like on fabricated structures have proven objectionable in nearly every case, in that they required the boring or tapping of portions of the structure, such as girts, for the adequate attachment thereto of the supporting means, the means in most cases being bolted to the structure. Obviously, when it was desired to mount a sectional ladder, for instance, an undesirable amount of difficulty was experienced in properly aligning the sections of the ladder. On the other hand, in case it was desired to move the ladder to the opposite side of the structure or to any new location thereon, it was necessary to again bore or tap portions of the structure to accommodate the securing means. These formerly known securing means were, therefore, highly objectionable due to the amount of labor they involved, and especially was this true when the fabricated structure was merely temporary.

The present invention is designed to overcome the above noted defects and objections in the provision of a supporting bracket which is readily and easily mountable on a support or portion of fabricated structure by merely engaging the bracket therewith and slightly rotating the same into positive engagement with the support, bolts or extraneous attachment means or operations being entirely eliminated.

The invention also seeks to provide a supporting bracket adapted to function in connection with a similar supporting bracket, both brackets being connected to the same article and engaged with the same support, the brackets being slidable along the support when their connection with the article is slightly loose, and fixed to the support when the connection is tightened, whereby if the article is in sections or elongated, alignment thereof is easily accomplished.

A further object of the present invention is to provide supporting brackets which are securable to a support, in an extremely easy manner, without the aid of any tools whatsoever or previous operations to the support, and just as easily removable and replaceable on another or the same support.

While some of the more salient features, characteristics, and advantages, of a device embodying this invention have been above pointed out, other will become apparent from the following disclosures.

The invention includes these and other features of construction and combinations of parts hereinafter described, and shown in a preferred form in the drawings, as more particularly indicated by the claims.

On the drawings:

Figure 1 is a fragmentary sectional view of a fabricated structure showing a ladder secured thereto by devices embodying principles of the present invention.

Figure 2 is an enlarged fragmentary view of a portion of the structure shown in Figure 1, and showing the devices more clearly.

Figure 3 is a fragmentary sectional view taken substantially along line III—III of Figure 2.

Figure 4 is a plan sectional view taken substantially along line IV—IV of Figure 2.

As shown in the drawings:

The apparatus selected to illustrate the present invention includes a fabricated structure 1 which, in this instance, is in the form of a tower or derrick and embodies a plurality of cross supports or girts 2. The girts 2 are shown in this instance, in the form of angle irons mounted as is customary in structures of this type with one face adjacent the uprights of the structure and one face projecting outwardly therefrom substantially horizontally. A sectional ladder 3 is attached to the girts 2 with the illustrated embodiment of the present invention, namely, supporting brackets generally indicated by reference numeral 4. The fabricated structure 1 is of a type that is fast becoming standardized so that the girts 2 will be equally spaced therealong in all embodiments of such a structure. It is possible, therefore, to predesign the ladder 3 so that certain rungs 5 thereof, which are in the nature of removable bolts held in position in the ladder by nuts 6 secured to the protruding ends thereof, will each be disposed adjacent one of the girts 2 when the ladder is properly positioned.

The brackets 4 are preferably utilized in pairs, as seen more clearly in Figure 2, each pair including a right and left hand bracket which are secured one to each side of the ladder 3. Each of the brackets includes an outwardly extending arm 7 apertured adjacent the outer end to receive the rung or bolt 5 therethrough. The inner portion of the arm 7 rests upon the horizontal flange or face of the angular girt 2. The inner end of the arm 7 terminates in a downwardly depending portion 8 which embraces the exterior face of the vertical flange of the girt 2. This portion 8 terminates in a transversely extending shoulder 9 which in turn terminates in an upright portion 10, substantially parallel to the depending portion 8, but spaced therefrom in one direction sufficiently to permit the reception of the vertical flange of the girt 2 between the portions 8 and 10.

The portion 10, of course, engages the inner face of the vertical flange of the girt, but it should be noted that although this portion is parallel to the depending portion 8 it is not in the same plane therewith but is offset therefrom a distance equal to the length of the shoulder 9, the shoulder being in very close proximity to the lower edge of the girt.

It will be apparent, therefore, that when the arm 7 of a bracket is swung or rotated outwardly relatively to the girt, the bracket is loosened and the portion 10 may be easily slipped downwardly from engagement with the girt. On the other hand, when the arm 7 is swung inwardly to a position substantially normal to the girt, the portions 8 and 10 firmly grip the girt and the engagement therewith is positive. The mounting of the bracket upon the girt is exceedingly simple, it being only necessary for the user to turn the arm outwardly, slip the portion 10 on the inside of the girt and swing the arm inwardly until the portions 8 and 10 firmly engage the girt. Obviously the device is just as easily removable and remountable on a different girt or a different portion of the same girt.

It is also to be noted that when a pair of brackets are mounted as seen in Figure 2, the nut 6 on the rung 5, need only be loosened slightly and the arm 7 will thereby be permitted to swing outwardly a trifle which, however, is sufficient to loosen the engagement of the brackets with the girt so that the ladder and bracket are slidable along the girt. It is apparent, therefore, that sections of the ladder may be easily and readily aligned. When the proper position is found the nuts 6 are tightened thereby drawing the arm 7 slightly inwardly and firmly clamping the bracket to the girt.

If one of the nuts 6 should become slightly loosened after the mounting of the ladder, the brackets are prevented from tipping outwardly due to weight imposed upon the ladder, by the close proximity of the shoulder 9 to the lower edge of the girt 2, thereby making the structure perfectly safe even though certain connections thereof become slightly insecure.

As shown in the drawings, all parts of a bracket are preferably integral, but it is to be understood that these parts may be formed separately and united, without departing from the spirit of this invention. It is also to be noted that although the bracket is shown, in this instance, as engaging an angular support, by slight changes in the dimensions of the bracket the same is equally adaptable for engaging practically any kind of support. Further, it is to be clearly understood that when the term "girt" is used herein and in the appended claims, the same is to be taken to mean any type of girt, strut, brace, or support.

From the foregoing it will be apparent that I have provided means for securing articles to a fabricated structure or any desired support, which means are extremely easy to mount or remove, afford a maximum of security, are easily adjusted when in use, and which may be economically manufactured.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A supporting bracket for engagement with an angle member, said bracket including means to engage the exterior of one of the sides of said member, laterally offset means to engage the interior of said side, and means to engage the exterior of the other side of said member and extend therebeyond.

2. A bracket for engagement with an angular member, said bracket including an outwardly extending arm, an angularly disposed portion on said arm, and an offset portion parallel to said first mentioned portion and adapted to loosely engage a portion of said member when said arm is disposed at an acute angle thereto, said member being positively engaged by said portions when said arm is swung to a position normal thereto.

3. Means for securing a ladder to a fabricated structure, said means including a pair of brackets, means on said brackets for loosely engaging a portion of said structure when said brackets are disposed at an acute angle thereto and for positively engaging said structure when said brackets are moved in opposite directions predetermined distances relative to said structure, said ladder being secured to said brackets.

4. Means for securing an article to an angular member, said means including a pair of brackets having bent portions for loosely slipping over a portion of said member and for thereafter tightly engaging said member when said brackets are swung transversely to said member in substantially the plane of said member.

5. In a bracket mountable on a support, an arm, and a pair of spaced non-aligned members connected to said arm for loosely engaging said support when said arm is in one position and thereafter tightly engaging said support when said arm is swung relatively thereto.

6. Means for mounting a ladder on a fabricated structure, said means including a pair of spaced brackets for loosely engaging a portion of said structure and swingable in a plane at right anges to the ladder into positive engagement therewith, a rung of said ladder being securable to portions of said brackets to maintain said positive engagement.

7. Means for securing an article to a support, said means including a pair of spaced brackets, arms on said brackets for connection with said article, and means on said arms for engagement with said support, said engagement being loose when said connection is sufficiently loose to permit said arms to diverge, said engagement being positive when said arms are drawn towards each other by tightening the connection of said arms with said article.

8. As an article of manufacture, a bracket for attachment to a given member, said bracket including portions defining a pocket for receiving said member, said portions being arranged for effective binding engagement with said given member only after said portions are rotated relative to said given member to a predetermined position.

9. In combination with a member to be supported, a bracket for supporting the same, and a mounting element for carrying the bracket, said bracket including laterally offset means defining a pocket for receiving said element and after the element is in said pocket serving to tightly and frictionally engage said element upon a relative movement of said element and said offset means.

10. In combination, a member to be supported, a bracket for supporting the same, a mounting element for carrying the bracket, said bracket including laterally offset means defining a pocket for receiving said element and after the element is in said pocket serving to tightly and frictionally engage said element upon a relative movement of said element and said offset means, and means for attaching said bracket to the member arranged when in one position to enable said relative movement and when in another position to tightly fasten said bracket to said element so that said member may be rigidly connected to said element.

11. As an article of manufacture, a bracket for engaging a member such as a girt comprising an angular element and laterally offset means on an end thereof disposed substantially parallel to one leg of said element and cooperating with said leg to define a pocket for receiving a portion of said member and formed so that upon a relative movement of the bracket and member it will frictionally engage and bind the bracket to the member.

12. In a bracket mountable on a support, an arm including a main body, a portion at an angle to the main body and a second portion at an angle to the first named portion, said portions being arranged for loosely engaging said support when said arm is in one position and thereafter tightly engaging said support when said arm is swung relative thereto.

13. In combination, a member to be supported, a bracket for supporting the same, and a mounting element for carrying the bracket, said bracket including laterally offset means defining a pocket for receiving said element and after the element is in said pocket serving upon being moved relative to said element to clampingly grip the same, whereby movement of said bracket along said element is prevented.

In testimony whereof I have hereunto subscribed my name at Tulsa, Tulsa County, Oklahoma.

JAMES O. REDINBAUGH.